US008612312B1

(12) United States Patent
Edwards et al.

(10) Patent No.: US 8,612,312 B1
(45) Date of Patent: Dec. 17, 2013

(54) ELECTRONICALLY MANAGING ITEMS IN A WISH LIST

(75) Inventors: Matthew M. Edwards, Seattle, WA (US); Nitin Bansal, Seattle, WA (US); Jacob D. Cohen, Kirkland, WA (US); Jeffrey J. Hsu, Mercer Island, WA (US); Don Le, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 302 days.

(21) Appl. No.: 13/076,317

(22) Filed: Mar. 30, 2011

(51) Int. Cl.
*G06Q 30/00* (2012.01)

(52) U.S. Cl.
USPC ..................... 705/26.8; 705/26.81

(58) Field of Classification Search
USPC ..................... 705/26.8, 26.81, 27.1
See application file for complete search history.

(56) References Cited

U.S. PATENT DOCUMENTS

| | | | | |
|---|---|---|---|---|
| 6,999,941 | B1 * | 2/2006 | Agarwal | 705/26.2 |
| 7,013,292 | B1 * | 3/2006 | Hsu et al. | 705/37 |
| 7,356,490 | B1 * | 4/2008 | Jacobi et al. | 705/26.8 |
| 7,444,297 | B2 * | 10/2008 | Shah | 705/26.41 |
| 7,797,204 | B2 * | 9/2010 | Balent | 705/28 |
| 7,925,542 | B2 * | 4/2011 | Shah | 705/26.1 |
| 8,429,026 | B1 * | 4/2013 | Kolawa et al. | 705/26.7 |
| 2001/0032130 | A1 * | 10/2001 | Gabos et al. | 705/14 |
| 2003/0154135 | A1 * | 8/2003 | Covington et al. | 705/26 |
| 2003/0158796 | A1 * | 8/2003 | Balent | 705/28 |
| 2006/0122926 | A1 * | 6/2006 | Hsu et al. | 705/35 |
| 2006/0274896 | A1 * | 12/2006 | Livesay | 380/255 |
| 2011/0016023 | A1 * | 1/2011 | Zakas | 705/27.1 |

OTHER PUBLICATIONS

Anon., "Evergreen Internet Launches the First Internet Gift Registry With Their Direct Marketing Partners," PR Newswire, p. 1028SFM074, Oct. 28, 1996.*
Anon., "RedCart.com Announces Web's First Universal Shopping Cart," PR Newswire, Nov. 1999.*
Anon., "Mall.com Reinvents Online Shopping with Universal Shopping Bag," PR Newswire, Jun. 15, 2000.*

\* cited by examiner

*Primary Examiner* — Nicholas D Rosen
(74) *Attorney, Agent, or Firm* — Knobbe, Martens, Olson & Bear, LLP (57) ABSTRACT

Systems and methods are provided for electronically managing items in a wish list. In some embodiments, order information associated with an order of one or more items may be received. The order may be associated with a purchasing customer, and may indicate that the purchasing customer is purchasing the one or more items of the order. One or more wish lists that were presented to the purchasing customer prior to receiving the order may be determined. For each of the one or more wish lists that were presented to the purchasing customer, it may be determined whether at least one of the items of the order is referenced in the wish list. The reference to the ordered item may then be removed from at least one of the wish lists.

29 Claims, 8 Drawing Sheets

ELECTRONICALLY MANAGING ITEMS IN A WISH LIST

BACKGROUND

Electronic commerce is an increasingly popular way of selling products and services, referred to herein collectively as "items," to consumers. The popularity of electronic commerce has prompted more vendors to make their products and services available over electronic networks, such as the Internet. Both vendors and computer users benefit from electronic commerce in a variety of ways. For example, users do not have to travel to a number of vendor locales to purchase a given item. Rather, a user can now purchase a desired item from the convenience of his or her home. Further, users can quickly compare a wide variety of similar items and prices from a number of vendors in order to make an informed choice in their purchases. Vendors are benefited, in part, because they can reach a much larger group of customers than those who reside in their geographic vicinity.

One beneficial feature that may be offered in an electronic commerce environment is the gift registry or wish list. A wish list may be maintained for a given user or customer, and may include a list of items that may be purchased as gifts for the user by others (or by the user himself at a later time). Many people make their wish lists public or accessible to friends, so that when a gift-giving occasion arises, such as a baby shower, wedding, birthday, Christmas, anniversary, graduation, retirement, etc., others are knowledgeable of items that are desired as gift for a given wish list owner.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to electronically managing items in an electronic wish list, including removing an item from a wish list in response to the item being ordered or purchased. One of the benefits of a wish list or gift registry is that it informs a potential gift purchaser of one or more items that the wish list owner would like to receive as a gift. Once a gift giver or other customer has purchased an item included in a given wish list in order to give the item to the wish list owner, it is desirable to remove the item from the corresponding wish list. Removing the item in response to the item being ordered may help to ensure that other users will not order the same item for the wish list owner as result of viewing items in the wish list. Similarly, if a wish list owner orders an item for herself that the wish list owner previously added to a wish list, it may be desirable to remove the item from her wish list. However, in a typical electronic commerce environment, a customer may order an item through a variety of interfaces other than simply selecting to purchase an item directly from a user interface that displays items in a wish list. Accordingly, as described herein, attributing an ordered or purchased item to a wish list (for example, to be subsequently removed from the wish list to which the purchase was attributed) may be based at least in part on determining whether the purchased or ordered item is included on any wish lists that the purchasing customer has viewed and/or any wish lists that the purchasing customer owns. Attributing the ordered or purchased item to a wish list may further include, in some embodiments, comparing shipping addresses associated with an order with customer address information associated with wish list owners.

In some embodiments, an attribution module as disclosed herein may be used to attribute an ordered item to a wish list, and to remove the item from the wish list to which the item was attributed. For example, the attribution module may receive information regarding an order of one or more items. The order may be associated with a purchasing customer, and may indicate that the purchasing customer is purchasing the one or more items of the order. The attribution module may determine one or more wish lists that were presented to the purchasing customer prior to receiving the order. For each of the one or more viewed wish lists that were presented to the purchasing customer, the attribution module may determine whether at least one of the items of the order is referenced in the wish list. The attribution module may then remove the reference to at least one of the ordered item from at least one of the viewed wish lists.

In other embodiments, the attribution module as disclosed herein may receive order information associated with an order of one or more items. The order may indicate that the purchasing customer is purchasing the one or more items. The attribution module may determine whether the purchasing customer is a wish list owner associated with one or more wish lists. For each of the one or more wish lists associated with the purchasing customer, the attribution module may determine whether at least one of the items of the order is referenced in the wish list. The attribution module may then remove the reference to at least one of the ordered items from at least one of the wish lists associated with the purchasing customer.

For the purposes of the present disclosure, an electronic wish list (or simply "wish list") is a list of references to items (such as products and/or services) that are of interest to a user or wish list owner associated with the wish list. For example, the wish list may include items that the wish list owner potentially desires as a gift from another user, or that the wish list owner is considering purchasing in the future. The term "wish list" as used herein may broadly include, according to some embodiments, gift registries (including registries for specific occasions, such as weddings or baby showers) and other lists or collections of items of interest to a creator or owner of the list. While the following description refers to wish lists in an electronic commerce (referred to herein as "e-commerce") context, those skilled in the art will recognize that the following description also applies to items other than products and services and/or in contexts other than e-commerce. Moreover, a wish list may be created and maintained by an entity other than a person, such as an organization, a team, a couple, a family, etc. Accordingly, while reference may be made herein to a wish list "owner" or a "user" associated with a wish list, it should be understood that this user or owner may be an individual person or any other entity. As will be appreciated, while a wish list may generally be used in examples herein, items may be attributed to and removed from item lists of various types, including but not limited to wish lists, gift registries and item lists of other types.

In regard to placing an item on a wish list, while some items that could serve as gifts are entirely electronic in nature such that they could actually be stored in the wish list (such as music and/or video files, electronic books, computer games, etc.), those skilled in the art will appreciate that, in general, the phrase "placing an item" on a wish list refers to placing a reference to an item on the wish list. Accordingly, while the following discussion may generally use the phrase "placing an item" on a wish list, or refer to an item being "included" in a wish list, these terms should be interpreted as a reference to the item (such as an identifier identifying the item) being placed on the wish list or included in the wish list. Similarly, "removing an item" from a wish list generally refers to removing or deleting the reference to the item from the wish list, or decreasing the quantity associated with the item in the wish list. In some embodiments, the information associated with an item in a wish list may include a quantity desired and a quantity purchased, in which case, "removing" an item from the wish list may include decreasing the quantity desired or increasing the quantity purchased.

Figure 1:
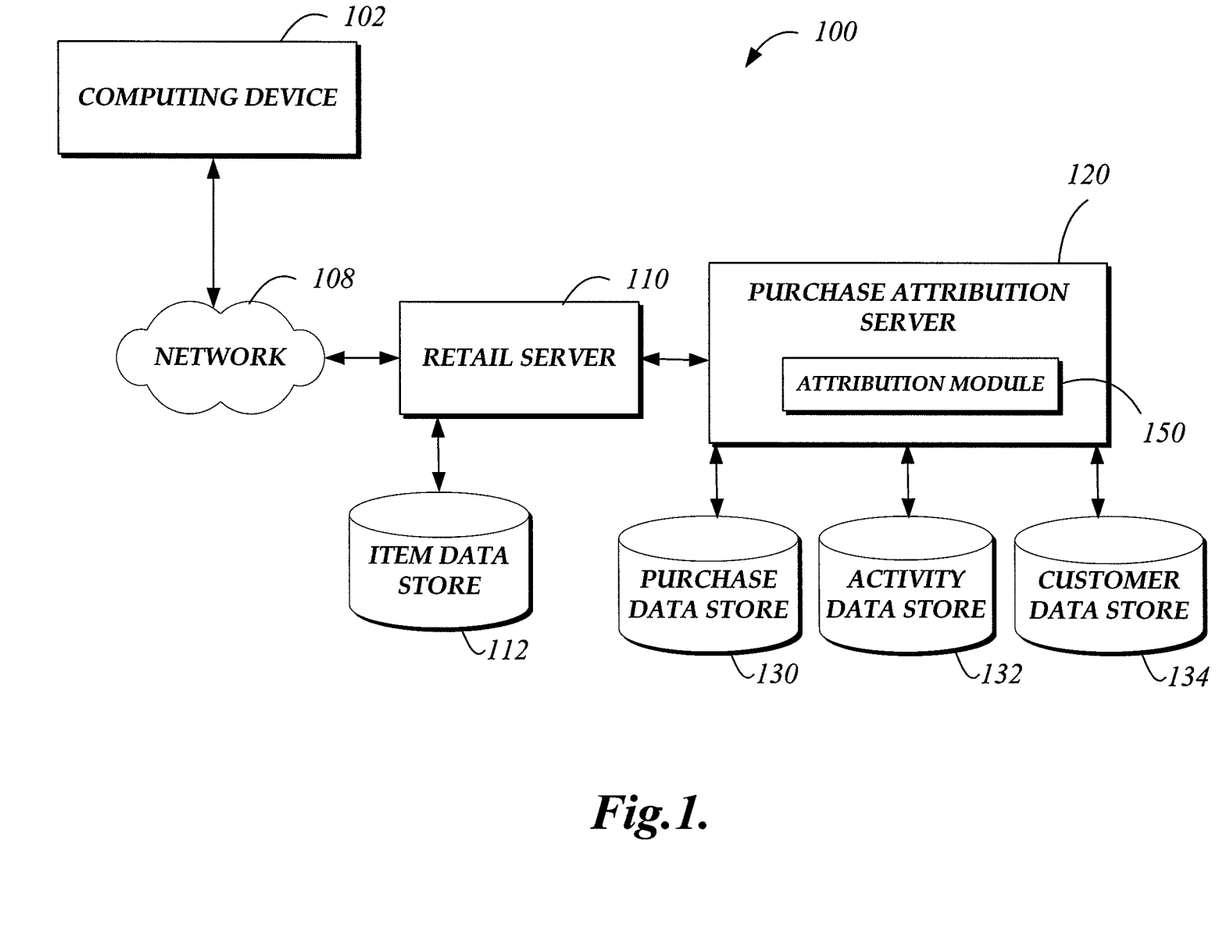
FIG. 1 is a block diagram depicting an illustrative operating environment including a retail server and a purchase attribution server for managing items in wish lists and/or gift registries.

FIG. 1 is a block diagram depicting an illustrative operating environment 100 for managing items in wish lists or gift registries. The illustrative operating environment includes a purchase attribution server 120 for attributing ordered items to one or more wish lists. The purchase attribution server 120 may include an attribution module 150 for determining a wish list to which to attribute an item ordered by a user, such that the attributed item may be removed from the wish list. The illustrated environment also includes a retail server 110 that facilitates electronic browsing and/or purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like.

The retail server 110 may be connected to or in communication with an item data store 112 that stores information associated with items available for browse and/or purchase. Item data stored in item data store 112 may include any information related to an item, such as an item available for purchase, that may be of interest to a user or may be useful for classifying or recommending an item. For example, item data may include, but is not limited to, price, availability, title, item identifier, item feedback (e.g., user reviews, ratings, etc.), item image, item description, item attributes, etc. While the item data store 112 is depicted in FIG. 1 as being local to retail server 110, those skilled in the art will appreciate that the item data store 112 may be remote to the retail server 110, and/or may be a network-based service itself.

The purchase attribution server 120 may be connected to or in communication with a purchase data store 130 that stores information associated with completed purchases, such as information identifying the items included in an order, a session identifier, information identifying the user or purchasing customer, shipping information, etc. The purchase attribution server 120 may additionally be connected to or in communication with an activity data store 132 that stores information associated with users' browsing or viewing activities, such as information regarding the pages or files that a user viewed and the content selected by a user in a given session. The purchase attribution server 120 may additionally be connected to or in communication with a customer data store 134 that stores information associated with customers and user accounts. For example, the customer data store 134 may include customer names, wish list information (including references to items of interest), shipping and billing addresses, etc. While the purchase data store 130, activity data store 132, and customer data store 134 are depicted in FIG. 1 as being local to purchase attribution server 120, those skilled in the art will appreciate that one or more of these data stores may be remote to the purchase attribution server 120, may be local to the retail server 110, and/or may be network-based services themselves.

In the environment shown in FIG. 1, the computing device 102 may communicate with the retail server 110 via a communication network 108, such as the Internet or other communications link. Those skilled in the art will appreciate that the network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. However, it will be appreciated by those skilled in the art that the system 100 could equally operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and/or peer to peer network configurations to implement at least a portion of the processes.

Figure 5:
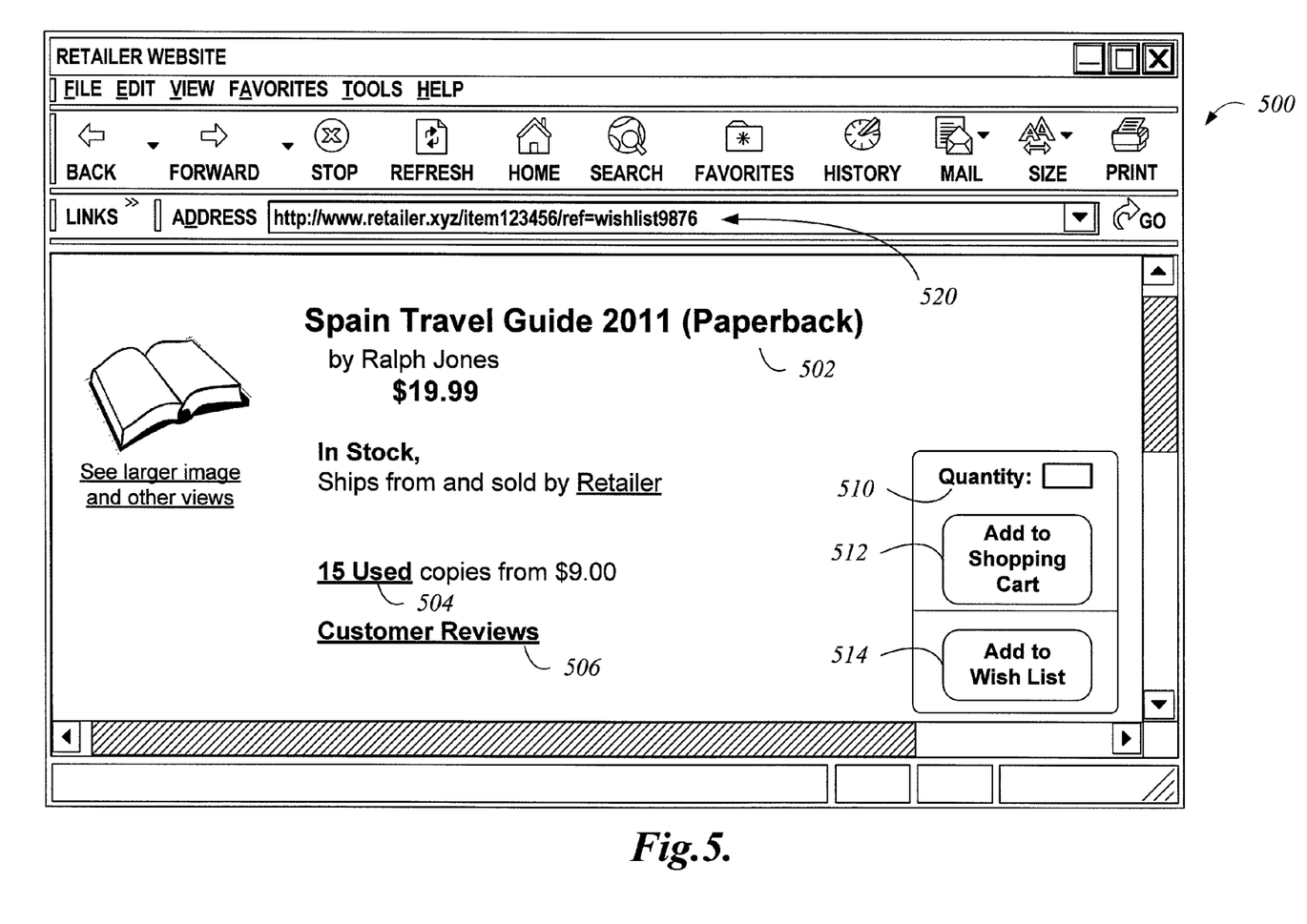
FIG. 5 is an illustrative user interface generated by the retail server that displays item information associated with an item, and which enables a user to add the item to an electronic shopping cart or a wish list.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. A non-limiting example of such a user interface is shown in FIG. 5.

The retail server 110 may obtain information on available goods and services (referred to herein as "items") from item data store 112, as is done in conventional electronic commerce systems. In one embodiment, the item data store 112 includes information on items available from a plurality of sellers (as opposed to storing information for only a single vendor). In certain embodiments, the retail server 110 may also access item data from other data sources, either internal or external to system 100. Accordingly, the retail server 110 may obtain item information for items offered for sale by a plurality of sellers. A user may then purchase items from a plurality of sellers in a single transaction or order placed with the retail server 110. In other embodiments, the user may purchase items from a single vendor in a single transaction or order placed with the retail server 110.

As described below in reference to FIG. 2, the purchase attribution server 120 may include a processing unit, a memory unit, an optional display, and a network interface, all of which may communicate with one another by way of a communication bus. The retail server 110 may be similarly arranged. A network interface included in the order management system 120 is preferably connected to one or more computer networks that connect to other components in the system 100. A processing unit may thus receive information and instructions from other computing components, such as the retail server 110 and item data store 112, via the network interface.

Figure 2:
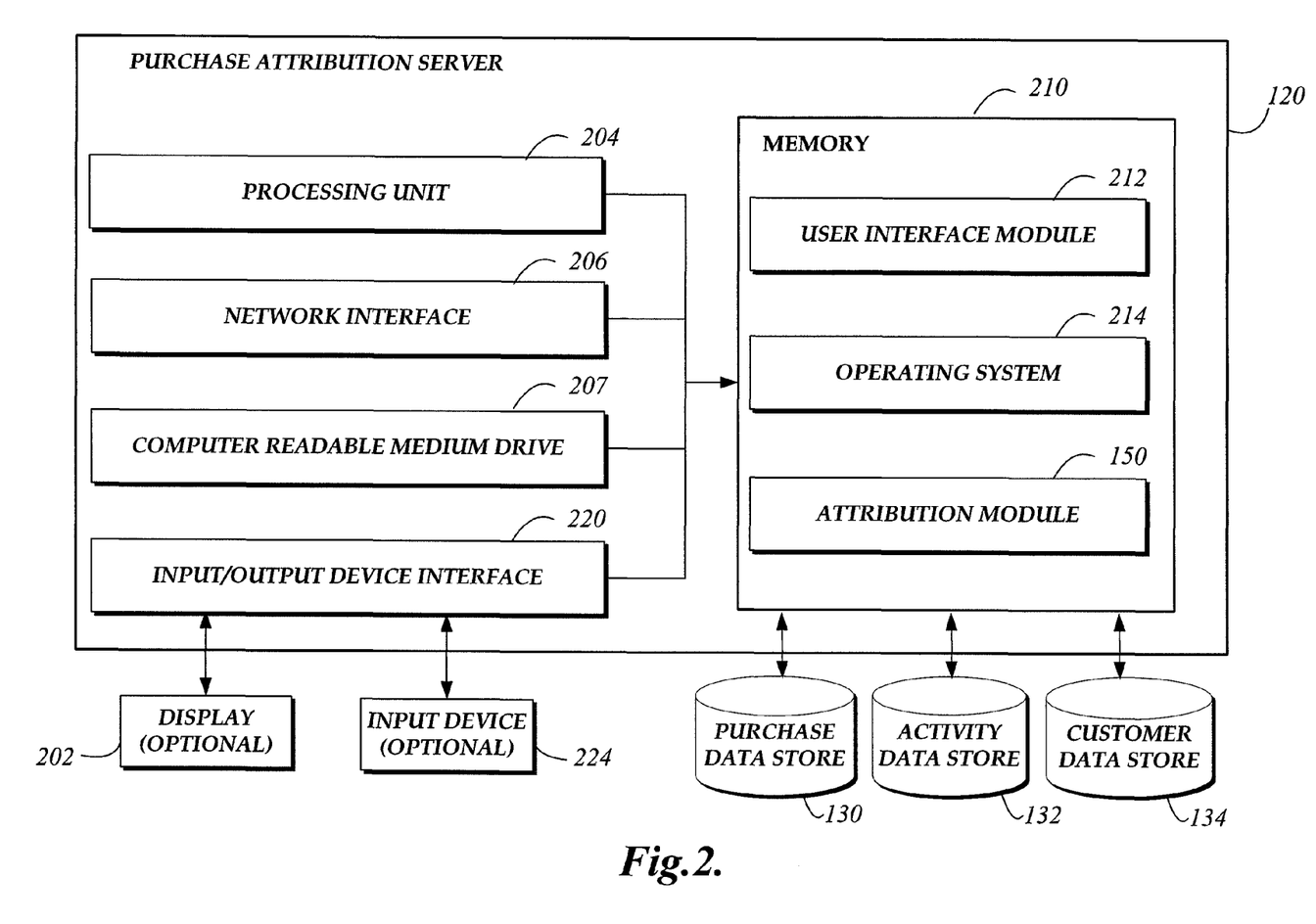
FIG. 2 depicts a general architecture of a purchase attribution server for attributing an ordered item to a wish list and/or gift registry.

FIG. 2 depicts a general architecture of a purchase attribution server 120 for attributing an ordered item to a wish list. The general architecture of the purchase attribution server 120 depicted in FIG. 2 includes an arrangement of computer hardware and software components that may be used to implement aspects of the present disclosure. Those skilled in the art will appreciate that the purchase attribution server 120 may include many more (or fewer) components than those shown in FIG. 2. It is not necessary, however, that all of these generally conventional components be shown in order to provide an enabling disclosure. As illustrated in FIG. 2, the purchase attribution server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from an optional input device 224, such as a keyboard, mouse, digital pen, touchscreen, etc.

The memory 210 contains computer program instructions that the processing unit 204 executes in order to implement one or more embodiments. The memory 210 generally includes RAM, ROM and/or other persistent, non-transitory computer-readable media. The memory 210 may store an operating system 214 that provides computer program instructions for use by the processing unit 204 in the general administration and operation of the purchase attribution server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with one or more auxiliary data stores, such as purchase data store 130, activity data store 132, and customer data store 134, discussed above. In addition to the user interface module 212 and operating system 214, the memory 210 may include an attribution module 150, discussed above in reference to FIG. 1, which may be executed by the processing unit 204.

Figure 3:
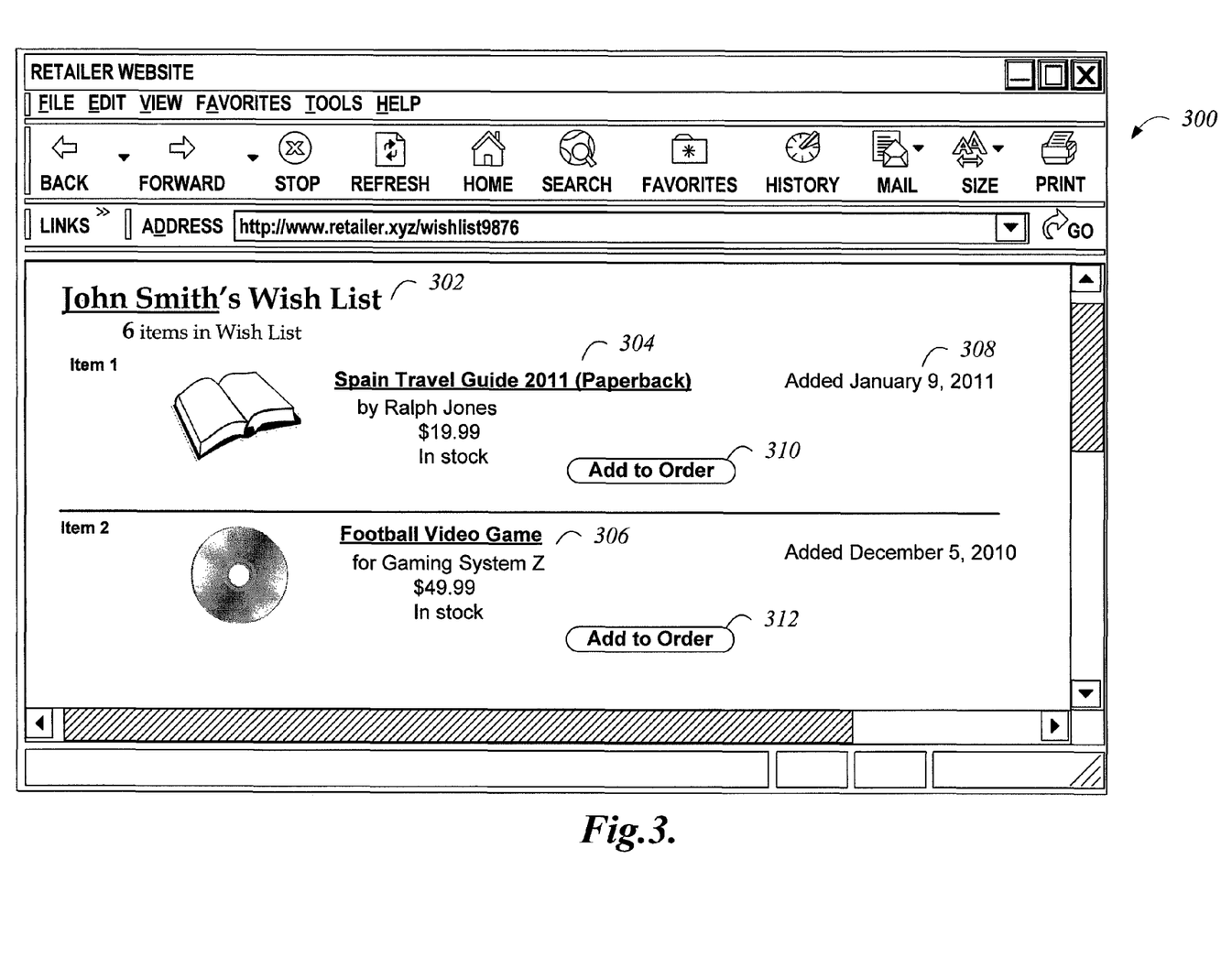
FIG. 3 is an illustrative user interface which may be generated by the purchase attribution server and/or the retail server that displays items in a wish list.

FIG. 3 is an illustrative user interface 300 which may be generated in part by the purchase attribution server 120 and/or in part by the retail server 110 that displays items in a wish list. As shown, the user interface 300 is displayed via a browser operating upon a computing device, such as computing device 102, utilized by a user. The illustrative user interface 300 may be considered to present a wish list 302 to the user. The user of computing device 102, who may be considered a viewer of the wish list 302, may be a friend or family member of the wish list owner considering purchasing a gift for the wish list owner, or may be the wish list owner himself. The wish list 302, identified as a wish list owned by user "John Smith," includes six items, of which items 304 and 306 are displayed. The items 304 and 306 (as well as the remaining items on the wish list 302 that are not displayed) may have been added to the wish list 302 by the wish list owner, John Smith. The wish list owner may have added the items 304 and 306 to wish list 302, for example, because the wish list owner is interested in purchasing the items 304 and 306 or receiving the items 304 and 306 as gifts from another user of the retail server 110.

As illustrated, item information for item 304 includes an item name, "Spain Travel Guide 2011," and a price at which the item may be purchased, $19.99. The user may select the item 304 title in order to request a user interface that displays additional item information associated with the item, such as user interface 500 discussed below with reference to FIG. 5. The additional item information may include pricing and availability information, images of the item, customer reviews of the item, and/or other information associated with the item. The user interface 300 additionally includes display of a date added 308, which indicates that the wish list owner added item 304 to the wish list 302 on Jan. 9, 2011. The user of computing device 102 may select option 310, "Add to Order," to add item 304 to an order or an electronic shopping cart associated with the user. The user may similarly select option 312 to add item 306 to the user's current order or electronic shopping cart. Selection of either add to cart options 310 or 312 may cause the retail server 110 and/or purchase attribution server 120 to generate a user interface that presents for display order information, such as user interface 600, discussed below with reference to FIG. 6.

In some embodiments, if a user selects the item 304 title in order to request to view additional information associated with the item, the purchase attribution server 120 may store item selection information associated with the user's request in activity data store 132. For example, prior to the browser operating upon the computing device 102 being redirected to a user interface that includes the requested item information, the selection of the item 304 title may cause item selection information to be sent to the purchase attribution server 120 from the computing device 102 and/or the retail server 110. The item selection information may be stored by the purchase attribution server 120 in activity data store 132 to be compared to order information that may be received later in the user's session when determining the appropriate wish list to which to attribute an ordered item, as discussed below. The item selection information may include a wish list identifier identifying the wish list 302 and an item identifier identifying the selected item 304. If the user has previously provided a user identifier or user name associated with the retail server 110, or if an identity of the user is otherwise known, the stored item selection information may include a user identifier identifying the user. If a user identifier for the user is not known or has not been provided, the item selection information may include a session identifier identifying the user's current browsing session. In other embodiments, the item selection information may include both a user identifier and a session identifier. Additional item selection information stored by the purchase attribution server 120 may include, for example, whether the user is the wish list owner of the wish list 302, a Uniform Resource Identifier ("URI") that the user is requesting to view, and/or whether the item has already been ordered and attributed to the wish list 302.

In some embodiments, a user interface that displays items in a wish list, such as user interface 300, may include additional selectable options associated with each item that are not illustrated in FIG. 3. For example, such a user interface may include an option to request a user interface that displays user reviews associated with a given item, such as item 304. In some such embodiments, the purchase attribution server 120 may store item selection information as a result of a user selecting one or more of these additional selectable options associated with an item displayed in a wish list.

Figure 4:
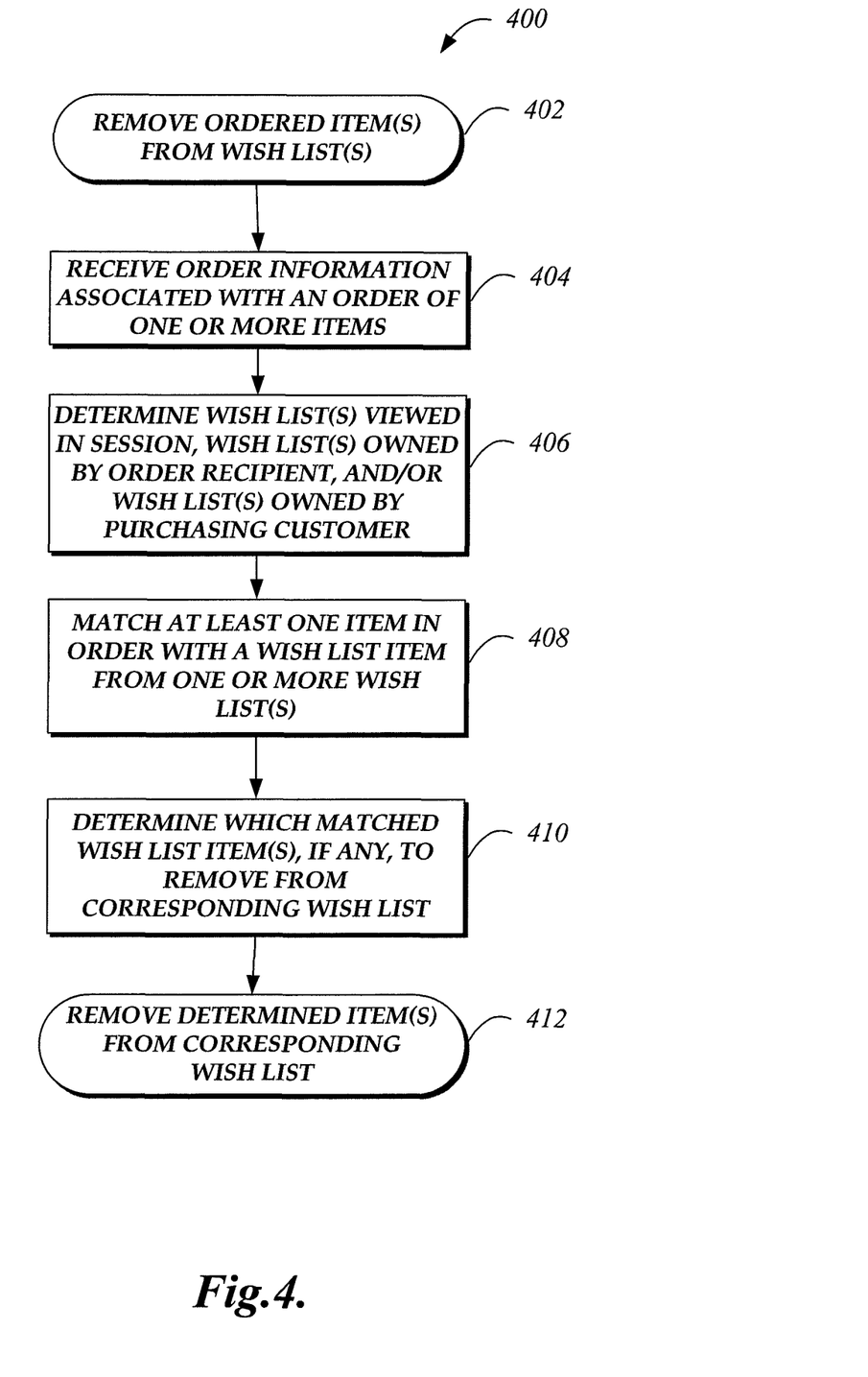
FIG. 4 is a flow diagram of an illustrative method implemented by the purchase attribution server for removing one or more ordered items from one or more wish lists or registries.

FIG. 4 is a flow diagram of an illustrative method 400 implemented by the purchase attribution server 120 (such as by the attribution module 150) for removing one or more ordered items from one or more wish lists or registries. In some embodiments, the illustrative method 400 may be implemented on a set schedule, such as daily, to determine whether items from any wish lists stored in customer data store 134 should be removed from the corresponding wish list as a result of the item being purchased for the wish list owner. In other embodiments, the illustrative method 400 may be implemented during the ordering process for an individual order, or soon after an order is received by the retail server 110, such that the wish list attribution for items in an order may occur substantially in real time as an order is processed by the retail server 110. In some embodiments, aspects of illustrative method 400 may be implemented during the order process, while other aspects are implemented at a later time, such as at the end of a day. For example, the purchase attribution server 120 may make an initial determination of a wish list from which to remove an ordered item in real time or near-real time when the item is ordered or added to an order, and then may implement additional verification of all attribution determinations made in a given day based in part on additional stored customer data and/or purchase data each night, for example, or in response to a triggering event, such as a request to view a given wish list.

The method 400 is described in terms of a system in which activity data and purchase data are stored in one or more data stores, such as activity data store 132 and purchase data store 130. As discussed above, purchase data store 130 may store information associated with completed purchases, such as information identifying the items included in an order, a session identifier, information identifying the user or customer, shipping information, etc. Activity data store 132 may store information associated with users' browsing or viewing activities and a given session identifier, such as information regarding the pages or files that a user viewed and the content selected by a user in a given session. In certain embodiments, as discussed above, activity data store 132 may include item selection information associated with a user request to view additional information associated with an item displayed in a wish list. The item selection information may include, for example, a wish list identifier, an item identifier, a user identifier, and/or a session identifier. In other embodiments, the system may store activity data and purchase data together, such as by session identifier. The purchase attribution server 120 may additionally or alternatively receive session information regarding the pages or files that a user viewed in a given session from the user's computing device, such as computing device 102, based on cookies or other information locally stored by the computing device.

The illustrative method 400 begins at block 402, then proceeds to block 404, where the purchase attribution server 120 receives order information associated with an order of one or more items. In embodiments in which method 400 is implemented during the order process or triggered by an individual order being placed, the order information may be received from retail server 110 or from computing device 102. In embodiments in which method 400 is implemented subsequent to an order or purchase occurring, such as on a set schedule, the order information may be retrieved from a data store, such as purchase data store 130. The received or retrieved order information may include, for example, item identifiers identifying the items of the order, a session identifier associated with the browsing session in which the order was placed, a user identifier identifying the purchasing customer, a shipping and/or billing address associated with the order, a time that the order was placed, and/or other information.

Once the purchase attribution server 120 has received the order information, the method 400 proceeds to block 406, where the purchase attribution server 120 may determine which wish lists, if any, were viewed by the purchasing customer in the session in which the order was placed. In embodiments in which method 400 is implemented during the order process, the purchase attribution server 120 may receive user browsing data from the computing device 102 and/or retail server 110. In other embodiments, such as embodiments in which method 400 is implemented on a set schedule, similar browsing data may be retrieved from a data store, such as activity data store 132. The browsing data may be associated with a session identifier, such that the purchase attribution server 120 may locate the browsing data corresponding to the browsing session in which the order or purchase was made by matching the session identifier associated with the purchase and the session identifier associated with the browsing data. The browsing data for a given session may include, for example, information identifying the pages viewed by the user, including the wish lists and items that the were displayed in user interfaces presented to the user. The browsing data may include a URI identifying the location of each page or user interface visited or viewed by the user in the browsing session. In some embodiments, the purchase attribution server 120 may determine the wish lists viewed by the purchasing customer in the session directly from the browsing data or from item selection information stored in activity data store 132, while in other embodiments, the purchase attribution server 120 may determine the wish lists viewed by the purchasing customer in the session based on determining whether any URI requested by the purchasing customer in the session includes as a portion of the URI a wish list identifier identifying a wish list.

At block 406, alternatively or additionally to determining the wish lists viewed by the purchasing customer, the purchase attribution server 120 may determine which wish lists, if any, are owned by the purchasing customer. For example, the purchasing customer may have provided a user identifier during the ordering process that identifies the purchasing customer as a user of the retail server 110. The purchase attribution server 120 may then determine whether the purchasing customer owns any wish lists by determining whether the given user identifier is associated with any wish lists stored in customer data store 134 (such as by the user identifier being identified in the customer data store 134 as the wish list owner of a given wish list). In other embodiments, the purchase attribution server 120 may determine whether the purchasing customer's name (such as the first name and last name associated with the billing information for the order) and/or address (such as the shipping address or billing address) matches the name and/or address associated with any wish lists stored in customer data store 134. In some embodiments, the purchase attribution server 120 may consider a name associated with the purchasing customer to match the name associated with a wish list owner even if the names are not an exact match (such as if the wish list owner's name includes a middle initial that is not included in the purchasing customer's shipping or billing information).

At block 406, alternatively or additionally to determining the wish lists viewed by the purchasing customer and/or the wish lists owned by the purchasing customer, the purchase attribution server 120 may determine which wish lists, if any, are owned by the order recipient. As will be appreciated, the order recipient may be someone other than the purchasing customer. For example, the purchasing customer may have ordered a gift to be shipped directly to the customer's intended gift recipient. In some embodiments, the purchase attribution server 120 may determine whether any wish list stored in customer data store 134 has a wish list owner that is associated with the order's shipping address and/or the name to which the order will ship. The wish list owner may be associated with the order's shipping address, for example, by the wish list owner having the same billing address, home address and/or shipping address (which may be retrieved, for example, from customer data store 134) as the shipping address associated with the order. In some embodiments, the purchase attribution server 120 may determine which wish lists are owned by the order recipient based at least in part on a user identifier provided by the purchasing customer. For example, according to certain embodiments, the retail server 110 may enable the purchasing customer to enter a user identifier identifying a user of the retail server 110 and/or identifying a shipping address of a user. The purchasing customer may provide the user identifier in order to indicate to the retail server 110 the person or entity to whom the order should ship, either in addition to or instead of providing a shipping address and shipping name for the order. The purchase attribution server 120 may determine at block 406 whether the identified user is identified as a wish list owner of a wish list stored in customer data store 134.

Once the purchase attribution server 120 has determined the wish list(s) viewed in the purchase session, the wish list(s) owned by the order recipient, and/or the wish list(s) owned by the purchasing customer, the method 400 proceeds to block 408. At block 408, the purchase attribution server 120 determines whether any items in the order match a wish list item in one or more of the wish lists determined at block 406 (which may include the wish lists viewed by the purchasing customer, the wish lists owned by the order recipient, and/or the wish lists owned by the purchasing customer). For example, the purchase attribution server 120 may determine, for each item in the order, whether an item identifier associated with the ordered item is referenced in any of the wish lists determined at block 406. In embodiments in which the purchase attribution server 120 has previously stored item selection information associated with a user's request to view item information associated with an item displayed in a wish list, the purchase attribution server 120 may determine whether an item identifier identifying the ordered item matches an item identifier in the stored item selection information. In some embodiments, the purchase attribution server 120 may consider an ordered item to match a wish list item even if the ordered item does share the same item identifier as the wish list item. For example, according to some embodiments, an ordered item may be considered a match if it is a variation of the wish list item, such as a similar item that differs in size, color, or other attribute. The purchase attribution server 120 may compare the time at which an item was added to the wish list with the time that the potentially matching item was added to the order, such that wish list items that were added to a wish list after the purchasing customer added the item to the order are ignored by the purchase attribution server 120 for purposes of method 400.

At block 410, the purchase attribution server 120 determines which matched wish list items (determined at block 408), if any, to remove from the corresponding wish list. In some embodiments, the determination that an item should be removed from a wish list due to the item being ordered or purchased may be considered to be "attributing" the ordered or purchased item to the wish list. If a given item of the order was only matched with an item from a single wish at block 408, the purchase attribution server 120 may, in some embodiments, determine that the item should be removed from that wish list. If instead the purchase attribution server 120 determines that a given item of the order matched items in multiple wish lists viewed by the purchasing customer and/or owned by the purchasing customer, the purchase attribution server 120 may consider additional factors in determining which wish list from which to remove the ordered item. In other embodiments, the purchase attribution server 120 may consider one or more of the additional factors discussed below even if an ordered item was only found on a single wish list.

The additional factors considered by the purchase attribution server 120 in determining which wish list from which to remove an ordered item may include determining whether the purchasing customer selected the item from the wish list. For example, selecting the item from the wish list may include that the user selected the item from a user interface displaying the wish list, where the selection indicated a request to view additional item information associated with the item, as discussed below with reference to FIG. 5. The determination of whether the user selected the item from the wish list may be made based on the user activity data discussed above, including information contained in a URI requested by the user, as will be described below with reference to FIG. 5. Additional factors considered by the purchase attribution server 120 in determining which wish list from which to remove an ordered item may include considering address or name information associated with the order and the wish list owner. For example, the purchase attribution server 120 may retrieve information from the customer data store 134 to determine whether any of the wish lists that include the ordered item are owned by a wish list owner that is associated with the same address as the shipping address associated with the order, and/or are owned by a wish list owner with a name matching the name in the shipping information associated with the order. This may indicate, for example, that the purchasing customer is requesting to ship the item to the wish list owner as a gift. Similarly, the purchase attribution server 120 may determine whether the shipping address associated with the order is within a predetermined geographic proximity (such as within a certain mile radius, within the same town or city, etc.) as an address associated with the wish list owner. The geographic proximity of the purchasing customer and the wish list owner, combined with the fact that the purchasing customer viewed the wish list prior to placing the order, may indicate that the purchasing customer is shipping the gift to himself in order to personally deliver the gift to the wish list owner. As will be described further below, in some embodiments, the purchase attribution server 120 may determine which wish list from which to remove an ordered item based in part on feedback from the purchasing customer confirming the appropriate wish list to which to attribute the ordered item.

In embodiments in which the purchase attribution server 120 has previously stored item selection information associated with a user's request to view item information associated with an item displayed in a wish list, the purchase attribution server 120 may determine which wish list items, if any, to remove from the corresponding wish list at block 410 based at least in part on the stored item selection information. For example, the purchase attribution server 120 may determine if any stored item selection information includes a user identifier that matches a user identifier of the ordering customer and/or includes a session identifier that matches the session in which the order was placed. If such item selection information is found, the purchase attribution server 120 may determine if the matching item selection information includes an item identifier identifying the ordered item. The inclusion of the item identifier in the item selection information may indicate that the ordering user, prior to ordering the item, requested to view additional information associated with the item from a wish list identified by a wish list identifier included in the item selection information. The purchase attribution server 120 may then determine that the ordered item should be removed from the wish list identified by the wish list identifier stored in the item selection information.

Once the purchase attribution server 120 has determined which wish list item, if any, to remove from the corresponding wish list, the purchase attribution server 120 removes the reference to the item from the wish list at block 412. If the wish list previously included an item quantity greater than one for the item to be removed, removing the item may be accomplished by decreasing the quantity of the item in the wish list, rather than completely removing the reference to the item in the wish list. For example, if a wish list indicated that the wish list owner desired twelve dinner plates, and the order only included six such dinner plates, removing the item from the wish list may mean decreasing the quantity of the dinner plates in the wish list by six. If instead the wish list only includes a quantity of one for a given item to be removed, removing the item may mean the item no longer appears on the wish list.

FIG. 5 is an illustrative user interface 500 generated by the purchase attribution server 120 that displays item information associated with an item 502, and which enables a user to add the item to an electronic shopping cart or a wish list. As shown, the user interface 500 is displayed via a browser operating upon a computing device, such as computing device 102, utilized by a user. User interface 500 includes an option for the user to enter the desired quantity 510 of the item, and an option 512 that the user may select in order to request that the item 502 be added to the user's electronic shopping cart. In some embodiments, adding the item to the user's electronic shopping cart may be considered adding the item to an order. The user interface 500 additionally includes an option 514 that the user may select in order to request that the item 502 be added to a wish list owned by the user. In some embodiments, selection of option 514 may cause the retail server 110 to generate a user interface that enables the user to select a wish list owned by the user to which the user would like to add the item. For example, the user may be a wish list owner of multiple wish lists and/or registries for different occasions or purposes (such as a birthday wish list, a wedding registry, etc.).

As illustrated in the browser address information of FIG. 5, the user interface 500 has been generated by the retail server 110 in response to a request from the computing device 102 for a user interface associated with URI 520. URI 520, as illustrated, includes a portion that reads "ref=wishlist9876." This portion may indicate that the computing device 102 requested user interface 500 as a result of the user selecting item 502 from a wish list identified by wish list identifier "wishlist9876." This portion of the URI 520, which may be stored in session information or browsing information associated with the user, may be considered by the purchase attribution server 120 when determining which wish lists were viewed by the user for purposes of attributing an eventual purchase of item 502, such as by the methods discussed above with reference to FIG. 4. As illustrated, user interface 500 additionally includes option 504 that the user may select in order to view a listing of used copies of item 502 that are for sale, as well as option 506 that the user may select in order to view customer reviews of item 502. While not illustrated, user interface 500 may additionally include other item information associated with item 502, such as size information, a summary of the item, information regarding related items, etc.

Figure 6:
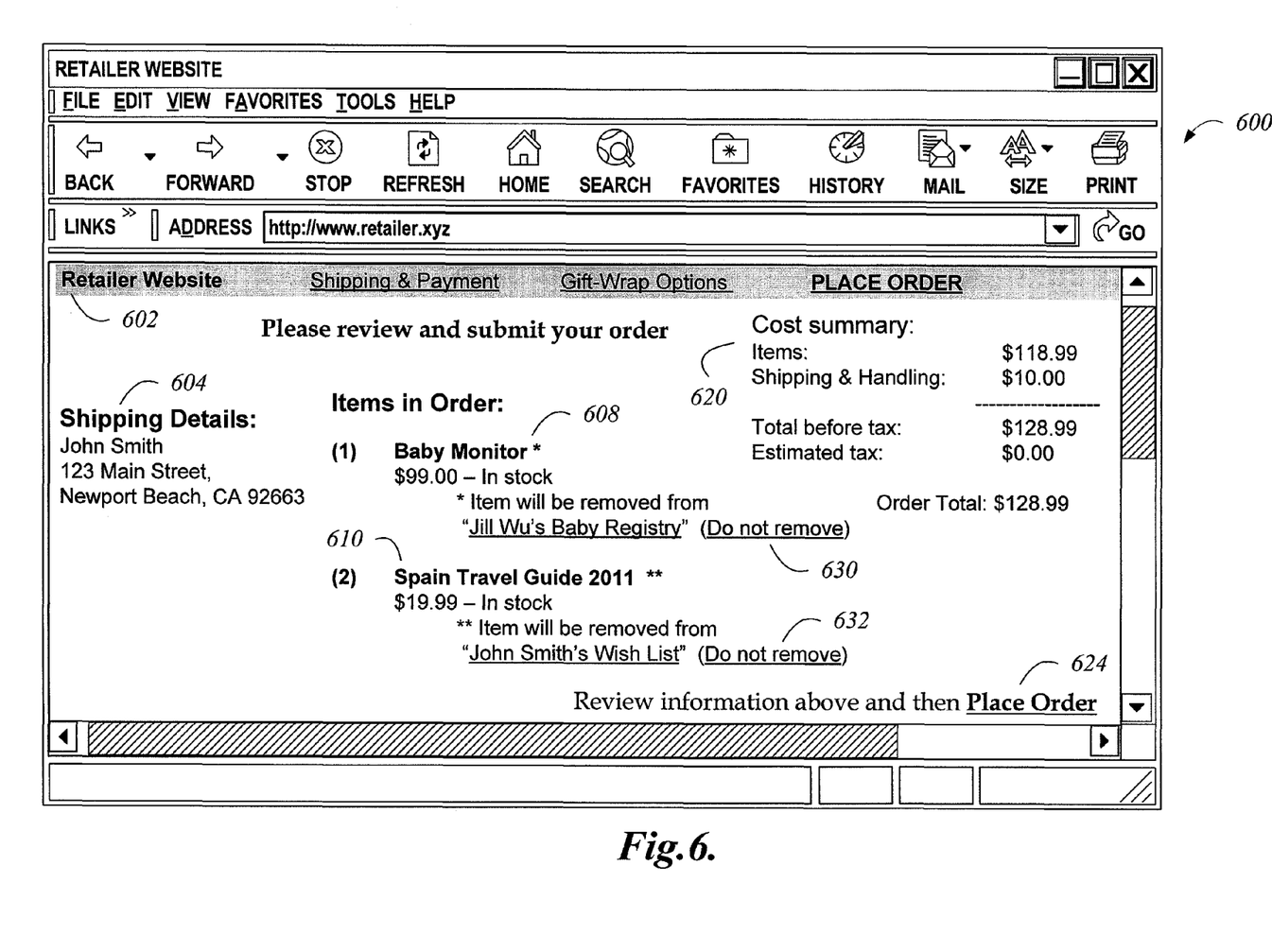
FIG. 6 is an illustrative user interface generated by the purchase attribution server and/or the retail server that displays order information associated with an order for two items.

FIG. 6 is an illustrative user interface 600 generated in part by the purchase attribution server 120 and/or in part by the retail server 110 that displays order information associated with an order for two items. As shown, the user interface 600 is displayed via a browser operating upon a computing device, such as computing device 102, utilized by a user who previously added one or more items to an order, but has not yet finalized or paid for the order. The illustrative user interface 600 may be displayed, for example, after the user has selected the items in the order (items 608 and 610) and entered shipping information 604. In the illustrated example, the user interface 600 includes a navigation bar 602 that enables the user to select text, such as "Shipping & Payment" or "Gift-Wrap Options," in order to request different interfaces from the retail server 110 via the browser device implemented by the computing device 102. For example, the user (who may be considered a purchasing customer) may be able to select the "Shipping & Payment" text in order to request a user interface that was previously presented to the user earlier in the purchasing process in order to adjust shipping and payment information previously submitted by the user. As illustrated, shipping details 604 include a name and address previously submitted by the user. For example, this name and address may have been submitted by the user to the retail server 110 earlier in the order process, or may have been retrieved by the retail server based on previously submitted information, such as retrieved from a data store based on the user submitting account information that has been previously associated with a given shipping address.

As illustrated, user interface 600 includes item attribution information 630 and 632 that indicates the wish list or registry to which the purchase attribution server 120 has determined that the items 608 and 610, respectively, should be attributed. As illustrated, the purchase attribution server 120 has determined that item 608, once ordered, should be attributed to the registry "Jill Wu's Baby Registry." The purchase attribution server 120 has determined that item 610, once ordered, should be attributed to wish list "John Smith's Wish List." The purchase attribution server 120 may have made the attribution determinations based on the methods described above with reference to FIG. 4. For example, the purchase attribution server 120 may have determined that item 608 should be attributed to Jill Wu's Baby Registry based on item 608 being included in Jill Wu's Baby Registry, and based at least in part on other determinations discussed above with reference to FIG. 4. For example, the attribution determination may have been made based at least in part on the user of computing device 102 having viewed Jill Wu's Baby Registry prior to adding item 608 to the order, the user of computing device 102 having selected the item 608 from Jill Wu's Baby Registry in order to view item details associated with the item, billing or shipping information associated with user Jill Wu being within a certain geographic proximity of the order shipping details 604, and/or other factors. The purchase attribution server 120 may have determined that item 610 should be attributed to "John Smith's Wish List," for example, based at least in part on the purchasing customer, John Smith, being the wish list owner of "John Smith's Wish List," and/or the shipping address 604 matching an address associated with an account of the wish list owner (such as a billing address, home address, etc.) of "John Smith's Wish List."

The purchasing customer, such as the user of computing device 102, may select the "Do not remove" option in attribution information 630 in order to indicate that the purchase attribution server 120 should not attribute the item 608 to "Jill Wu's Baby Registry," and accordingly should not remove the item 608 from "Jill Wu's Baby Registry" once the order is placed. The purchasing customer may select the "Do not remove" option in attribution information 630, for example, if the customer does not intend to give item 608 as a gift to the owner of "Jill Wu's Baby Registry." For example, the purchasing customer may have first discovered the "Baby Monitor" item 608 by viewing the items in "Jill Wu's Baby Registry," but may in fact be purchasing the item 608 for himself, or as a gift for someone other than the owner of the registry. The purchasing customer may select the "Do not remove" option in attribution information 632, for example, if the purchasing customer, John Smith, is purchasing the "Spain Travel Guide 2011" item 610 as a gift for someone other than himself, and desires to keep the item 610 on his wish list, "John Smith's Wish List," because he is still interested in receiving or purchasing item 610 for himself at a later time. In some embodiments, if the purchasing customer selects the "Do not remove" option, the purchasing customer may be presented with a user interface that includes options of alternative wish lists or registries that the purchasing customer may select in order to attribute the ordered item to the selected wish list or registry. In other embodiments, the attribution information may be listed as an option that the user selects in order for the removal of the item from the wish list to occur, such as by prompting the user "Should this item be removed from Jill Wu's Baby Registry?"

The user interface 600 additionally includes a cost summary 620 that includes the cost of the items, the cost of shipping and handling, a total cost before tax, an estimated tax, and an order total. The shipping and handling charge of $10.00 in the illustrated example may be calculated, for instance, based on the shipping details 604 provided by the user, item attributes of items 608 and 610, such as size and weight of each item, and one or more shipping and handling calculation formulas that may be associated in item data store 112 with the shipping destination and/or the items in the order. Once the user has reviewed the information displayed in user interface 600, the user may select the "Place Order" text 624 to finalize the order and pay the order total indicated in cost summary 620.

Figure 7:
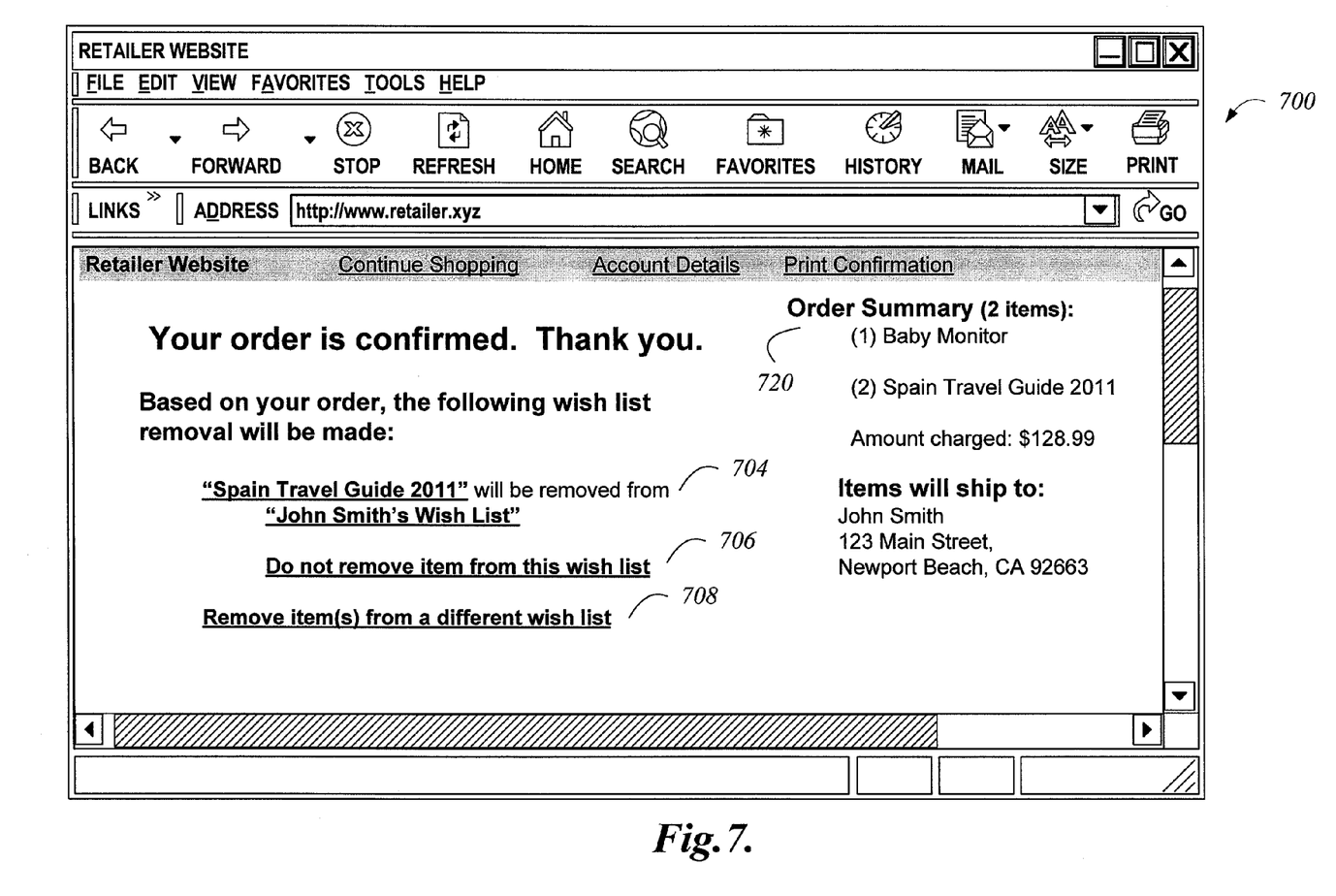
FIG. 7 is an illustrative user interface generated by the purchase attribution server and/or the retail server that includes information identifying an ordered item that the purchase attribution server has attributed to a wish list, and which enables a user to confirm that the ordered item should be removed from the wish list.

FIG. 7 is an illustrative user interface 700 generated in part by the purchase attribution server 120 and/or in part by the retail server 110 that includes information identifying an ordered item 704 that the purchase attribution server 110 has attributed to a wish list, and which enables a user to confirm that the ordered item 704 should be removed from the wish list. User interface 700 may be presented to the user, for example, after the user selects the "place order" option 624 of user interface 600 discussed above with reference to FIG. 6. Alternatively, user interface 700 may be presented to the user prior to the user being given the "Do not remove" option discussed above with reference to FIG. 6 (for example, the user may have placed an order without having been previously notified of any wish lists to which an ordered item may be attributed). As indicated by order summary information 720, the confirmed order includes two items. As indicated by text 704, the purchase attribution server 120 has determined that one of the items of the order, "Spain Travel Guide 2011," will be removed from the wish list "John Smith's Wish List." The user may selection "Do not remove" option 706 in order to indicate that the purchase attribution server 120 should not remove the item from "John Smith's Wish List."

The user may select "Remove item(s) from a different wish list" option 708 in order to be presented with options identifying other potential wish lists from which the items of the order may be attributed based on selection by the user (not illustrated). For example, the options identifying potential wish lists from which the items of the order may be attributed may include additional wish lists that the purchase attribution server 120 has determined contain one or more items of the order. In other embodiments, the attribution confirmation information may ask the purchasing customer whether a given item should be removed from a given wish list, such that the purchase attribution server 120 will not remove the item unless the user selects to do so (not illustrated).

While attribution confirmation information is displayed in FIG. 7 as being presented to the purchasing customer as a user interface 700 presented after the order is placed, in some embodiments, the purchase attribution server 120 may present the attribution confirmation information and options to remove or not remove the item(s) from the attributed wish lists via one or more additional or alternative notification mechanisms. For example, attribution confirmation information similar to that shown in user interface 700 may be presented to the purchasing customer by an email, a text message, and/or may be presented via a user interface that includes other account information regarding the user's account associated with the retail server 110.

Figure 8:
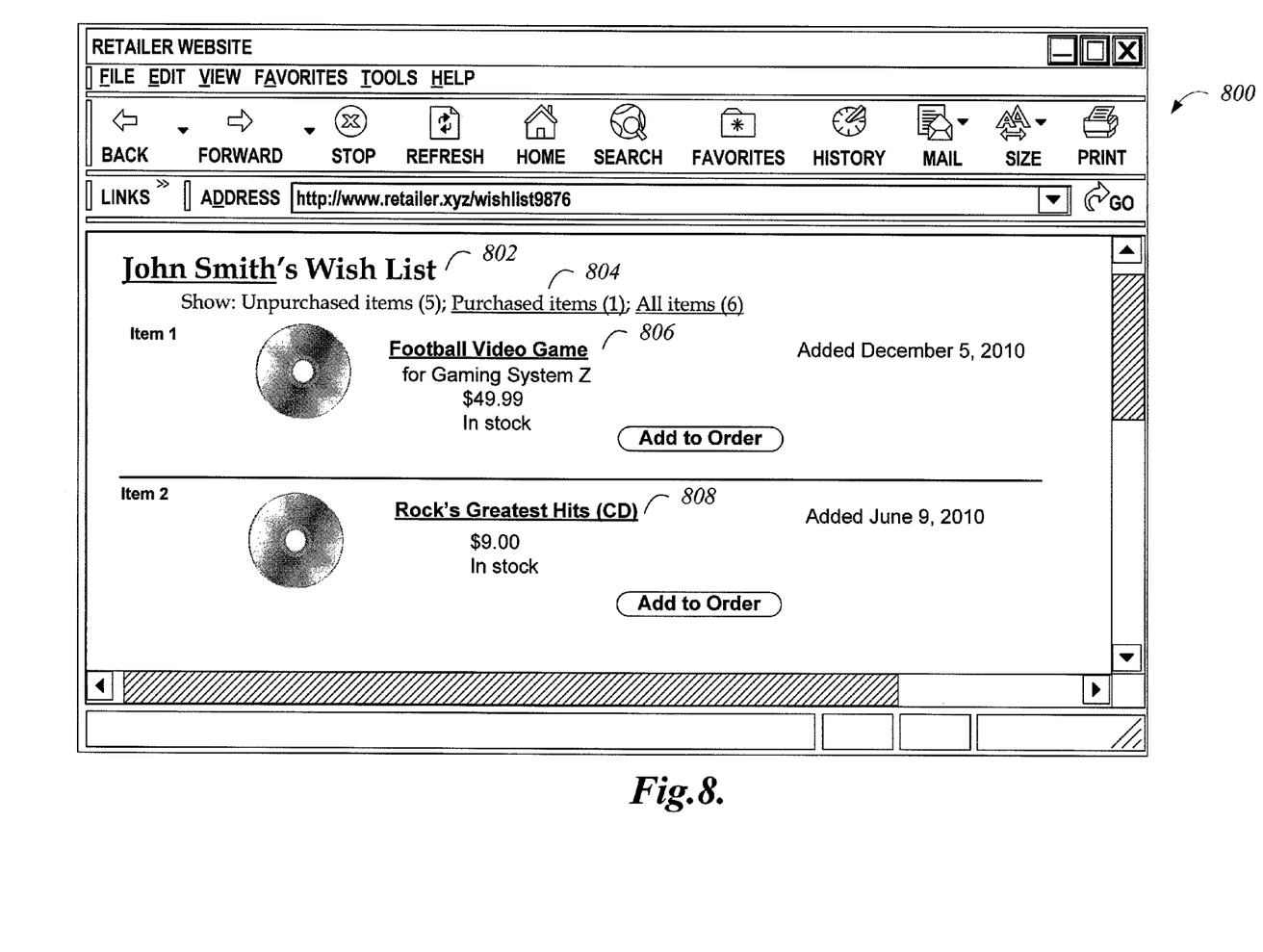
FIG. 8 is an illustrative user interface which may be generated by the purchase attribution server and/or the retail server that displays items in a wish list after an item has been removed from the wish list.

FIG. 8 is an illustrative user interface 800 which may be generated in part by the purchase attribution server 120 and/or in part by the retail server 110 that displays items in a wish list after the purchase attribution server 120 has removed an item from the wish list. The wish list 802, identified as a wish list owned by user "John Smith," may be the same wish list discussed above with reference to FIG. 3 after the "Spain Travel Guide 2011," discussed above, has been purchased by a customer and removed from the wish list by the purchase attribution server 120. The wish list 802 includes five items that have not yet been purchased for the wish list owner (of which items 806 and 808 are displayed), rather than the six items previously included in the wish list displayed in FIG. 3. As indicated by options 804, the user interface 800 displays the five items of the wish list 802 that have not been purchased. The user may select from options 804 in order to request a user interface that displays the one purchased item from the wish list (which may be the "Spain Travel Guide 2011," discussed above), or all six items of the wish list (regardless of whether the items have already been ordered or purchased). User interface 800 may correspond, for example, to an embodiment in which "removing" an item from the wish list 800 means decreasing a quantity of the item desired or increasing a quantity purchased. In the illustrated embodiment, ordered or purchased items that have been attributed to wish list 802 may remain associated with the wish list in customer data store 134, but the purchase attribution server 120 may filter the items displayed to a user requesting to view the wish list 802 based on whether the desired quantity of the item is greater than the quantity already ordered or purchased.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for electronically managing items in a wish list, the system comprising:
    a data store that stores information regarding a plurality of wish lists, wherein each of the plurality of wish lists comprises references to one or more items; and
    a computing device in communication with the data store and that is operative to:
        receive order information associated with an order of one or more items, wherein the order is associated with a purchasing customer, wherein the order indicates that the purchasing customer is purchasing the one or more items;
        determine two or more wish lists that were presented to the purchasing customer prior to receiving the order information;
        for each of the two or more wish lists that were presented to the purchasing customer, determine whether the wish list includes a reference to at least one of the one or more items of the order; and
        remove the reference to the at least one of the one or more items of the order from at least one of the two or more wish lists that were presented to the purchasing customer.

2. The system of claim 1, wherein the reference to the at least one item of the order is removed from the at least one of the two or more wish lists that were presented to the purchasing customer based at least in part on a determination that the at least one item was selected by the purchasing customer from a user interface comprising display of the at least one of the two or more wish lists that were presented to the purchasing customer.

3. The system of claim 1, wherein the reference to the at least one item of the order is removed from the at least one of the two or more wish lists that were presented to the purchasing customer based at least in part on a determination that a wish list owner associated with the at least one of the two or more wish lists is associated with a shipping address associated with the order.

4. A system for electronically managing items in a wish list, the system comprising:
    a data store that stores information regarding a plurality of wish lists, wherein each of the plurality of wish lists comprises references to one or more items, wherein each of the plurality of wish lists is associated with a wish list owner identifier identifying a customer that created the wish list; and
    a computing device in communication with the data store and that is operative to:
        receive order information associated with an order of one or more items, wherein the order is associated with an ordering user, wherein the order indicates that the ordering user is ordering the one or more items;
        determine whether the ordering user is a wish list owner associated with one or more of the plurality of wish lists;
        for each of the one or more wish lists associated with the ordering user, determine whether the wish list includes a reference to at least one of the one or more items of the order; and
        remove the reference to the at least one item of the one or more items of the order from at least one of the one or more wish lists associated with the ordering user.

5. The system of claim 4, wherein the reference to the at least one item of the order is automatically removed from the at least one wish list in response to receiving the order information.

6. The system of claim 4, further comprising, prior to removing the reference to the at least one of the one or more items of the order from the at least one of the one or more wish lists, receiving a confirmation from the ordering user confirming that the at least one of the one or more items should be removed from the at least one of the one or more wish lists.

7. The system of claim 4, wherein determining whether the ordering user is the wish list owner associated with one of the plurality of wish lists comprises determining that a user identifier associated with the order matches a wish list owner identifier associated with the one of the plurality of wish lists.

8. The system of claim 4, wherein determining whether the ordering user is the wish list owner associated with one of the plurality of wish lists comprises determining that a customer name associated with the order is similar to a name associated with the one of the plurality of wish lists.

9. The system of claim 4, further comprising, prior to removing the reference to the at least one of the one or more items of the order from the at least one of the one or more wish lists, determining that the ordering user selected to view item information associated with the at least one of the one or more items of the order from a display of the at least one of the one or more wish lists prior to the ordering user ordering the one or more items.

10. The system of claim 9, wherein the item information associated with the at least one of the one or more items of the order comprises at least one user review associated with the at least one of the one or more items of the order.

11. A computer-implemented method for electronically managing items in a wish list, the computer-implemented method comprising:
as implemented by one or more computing devices configured with specific executable instructions,
receiving order information associated with an order of one or more items, wherein the order information includes information identifying an order recipient to receive the one or more items of the order;
determining two or more wish lists associated with the order recipient, wherein each of the two or more wish lists comprises references to one or more items;
for each of the two or more wish lists associated with the order recipient, determining whether the wish list includes a reference to at least one of the one or more items of the order; and
removing the reference to the at least one of the one or more items of the order from at least one of the two or more wish lists associated with the order recipient.

12. The computer-implemented method of claim 11, wherein determining two or more wish lists associated with the order recipient comprises determining at least one of a wish list associated with a shipping address associated with the order and a wish list associated with an order recipient name included in the order information.

13. The computer-implemented method of claim 11, wherein the reference to the at least one item of the order is removed from at least one of the two or more wish lists based at least in part on a determination that the at least one item was selected by an ordering user from a user interface comprising display of the at least one of the two or more wish lists.

14. The computer-implemented method of claim 11, wherein the reference to the at least one item of the order is removed from the at least one of the two or more wish lists based at least in part on a determination that a uniform resource identifier associated with a user interface presented for display to an ordering user prior to receiving the order information includes identification information identifying the at least one of the two or more wish lists, wherein the user interface presented to the ordering user included item information associated with the at least one item of the order.

15. The computer-implemented method of claim 11, wherein removing the reference to the at least one of the one or more items of the order from the at least one of the two or more wish lists comprises decreasing a quantity associated with the at least one of the one or more items in the at least one of the two or more wish lists.

16. The computer-implemented method of claim 11, further comprising removing a reference to an item that is similar to at least one of the one or more items of the order from at least one of the two or more wish lists.

17. A non-transitory, computer-readable medium having a computer-executable component, the computer-executable component comprising:
an order attribution component for:
receiving order information associated with an order of one or more items, wherein the order is associated with an ordering user;
based at least in part on user activity data that identifies content requested for viewing by the ordering user, determining one or more item lists that were presented to the ordering user prior to receiving the order information, wherein each of the one or more item lists comprises references to one or more items;
for each of the one or more item lists that were presented to the ordering user, determining whether the item list includes a reference to at least one of the one or more items of the order; and
removing the reference to the at least one of the one or more items of the order from at least one of the one or more item lists.

18. The non-transitory, computer-readable medium of claim 17, wherein the one or more item lists include at least one of a wish list and a gift registry.

19. The non-transitory, computer-readable medium of claim 17, wherein the reference to the at least one item of the order is removed from the at least one of the one or more item lists based at least in part on a determination that the at least one item was selected by the ordering user from a user interface comprising display of the at least one of the one or more item lists.

20. The non-transitory, computer-readable medium of claim 17, wherein the reference to the at least one item of the order is removed from the at least one of the one or more item lists based at least in part on a determination that a uniform resource identifier associated with a user interface presented for display to the ordering user prior to receiving the order includes identification information identifying the at least one of the one or more item lists, wherein the user interface presented to the ordering user included item information associated with the at least one item of the order.

21. The non-transitory, computer-readable medium of claim 17, wherein the ordering user did not select the at least one item of the order from the at least one of the one or more item lists.

22. The non-transitory, computer-readable medium of claim 17, wherein the reference to the at least one item of the order is removed from the at least one of the one or more item lists based at least in part on a determination that an owner of the at least one of the one or more item lists is associated with a shipping address associated with the order.

23. The non-transitory, computer-readable medium of claim 17, wherein the reference to the at least one item of the order is removed from the at least one of the one or more item lists based at least in part on a determination that an owner of the at least one of the one or more item lists is associated with an address that is within a predetermined geographic proximity to a shipping address associated with the order.

24. The non-transitory, computer-readable medium of claim 17, wherein the order attribution component is further configured to remove a reference to an item that is similar to at least one of the one or more items of the order from at least one of the one or more item lists.

25. The non-transitory, computer-readable medium of claim 17, wherein the order attribution component is further configured to, prior to receiving the order information associated with the order:
in response to a request associated with the ordering user to view item information associated with an item from an item list presented to the ordering user, storing item selection information, wherein the item selection information comprises an item list identifier identifying the item list presented to the ordering user and an item identifier identifying the item associated with the request.

26. The non-transitory, computer-readable medium of claim 25, wherein the reference to the at least one of the one or more items of the order is removed from the at least one of the one or more item lists based at least in part on the stored item selection information.

27. The non-transitory, computer-readable medium of claim 26, wherein the reference to the at least one of the one or more items of the order is removed from the at least one of the one or more item lists based at least in part on a determination that the item identifier of the item selection information identifies the at least one of the one or more items of the order and the stored item list identifier of the item selection information identifies the at least one of the one or more item lists.

28. The non-transitory, computer-readable medium of claim 27, wherein the reference to the at least one of the one or more items of the order is removed from the at least one of the one or more item lists based at least in part on a determination that the item selection information further comprises at least one of a user identifier identifying the ordering user and a session identifier associated with the order.

29. The non-transitory, computer-readable medium of claim 25, wherein the item information associated with the item from the item list presented to the ordering user comprises at least one user review associated with the item.

\* \* \* \* \*